Figure 1:
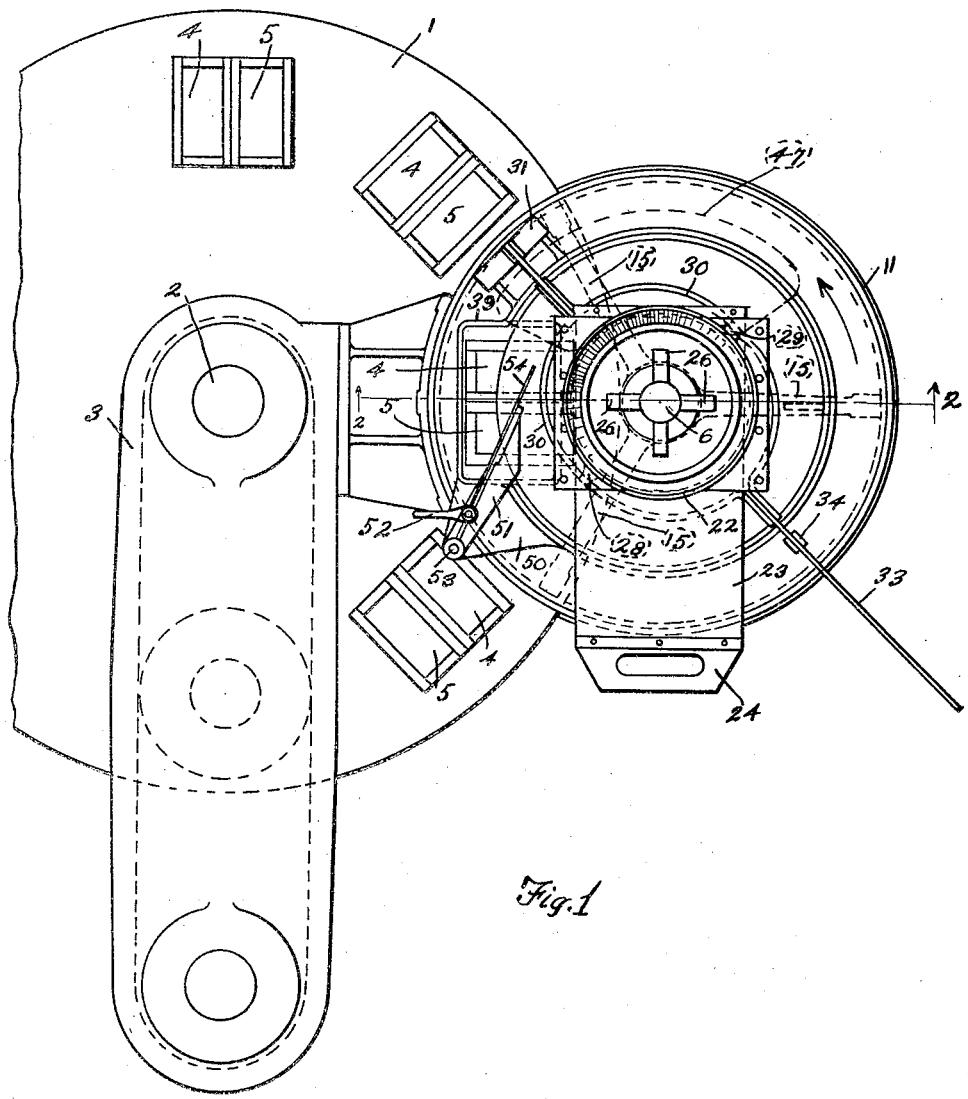

Aug. 16, 1932.   R. B. STUCKEY   1,872,520
MOLD FEEDING DEVICE FOR BRICK PRESSES
Filed Dec. 27, 1929   2 Sheets-Sheet 1

INVENTOR.
Robert B. Stuckey
BY
Fay O'Farlin & Fay
ATTORNEYS

Aug. 16, 1932.   R. B. STUCKEY   1,872,520
MOLD FEEDING DEVICE FOR BRICK PRESSES
Filed Dec. 27, 1929   2 Sheets-Sheet 2

INVENTOR.
Robert B. Stuckey
BY
Ray Oberlin & Ray
ATTORNEYS

Patented Aug. 16, 1932

1,872,520

UNITED STATES PATENT OFFICE

ROBERT B. STUCKEY, OF BUCYRUS, OHIO, ASSIGNOR TO W. A. RIDDELL COMPANY, OF BUCYRUS, OHIO, A CORPORATION OF OHIO

MOLD FEEDING DEVICE FOR BRICK PRESSES

Application filed December 27, 1929. Serial No. 416,853.

My invention, relating as indicated, to mold filling devices for work presses, has specific reference to a device which is adaptable to feed the finely divided material from which bricks are usually made to the molds which are carried by a rotatable or like table forming a part of the brick-press mechanism.

In the manufacture of bricks the usual method of filling the molds in which the bricks are pressed, is to position a feed hopper immediately above the mold-carrying table, which hopper has an aperture formed in the bottom thereof directly over the position occupied by the mold cavities, and then feeding the material into this hopper. One of the undesirable features of this type of construction is that the height of the material in the feeding hopper necessarily varies to a considerable extent during the operation of the mechanism, and consequently the force with which the material is precipitated into the mold cavities varies accordingly. This variation of the force by which the material is fed into the molds will cause the density of the material in the several molds to likewise vary, resulting in inequalities in the finished product. It is, therefore, an object of my invention to provide a means whereby the vertical distance occupied by the material which is fed to the molds is constant at all times during the operation of the brick press, achieving a uniformity in the density of the finished product not possible with any of the common types of feeding devices now employed.

As before explained, the feed hopper which contains the material which is supplied to the mold cavities is positioned directly above the revolvable, or like mold-carrying table, and after the mold cavities having been filled are moved out from under the aperture in the bottom of the feed hopper and an empty mold moved into place thereof. The material from the hopper is permitted to flow onto the surface of the table and the table proper, therefore relied upon as a closure means for the material feeding orifice. This flowing of the material from the feed hopper onto the mold-carrying table proper interferes with the efficient operation of the brick press as a whole and also materially decreases the life of the various operative parts. It is an object of my invention to provide a means whereby the material delivery orifice is closed and the material prevented from falling onto the movable table as the mold cavities are respectively moved to their various positions.

In the common forms of brick machines adapted for mass production the mold cavities are usually grouped on the mold-conveying table so that a plurality of the molds are filled for each position of such table. The construction of the feed hoppers now commonly employed, by means of which these grouped mold cavities are filled, is such that no means is provided for directing the main stream of down-flowing material so that it will be broken up into the number of parts corresponding to the number of mold cavities to be filled. By breaking up the stream of feeding material, an equalization in the density of the material as fed into the several molds of the group is effected. It is a further object of my invention, therefore, to provide means whereby the main stream of material as fed to the mold cavities is broken up and definitely directed into the several cavities. Other objects of my invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
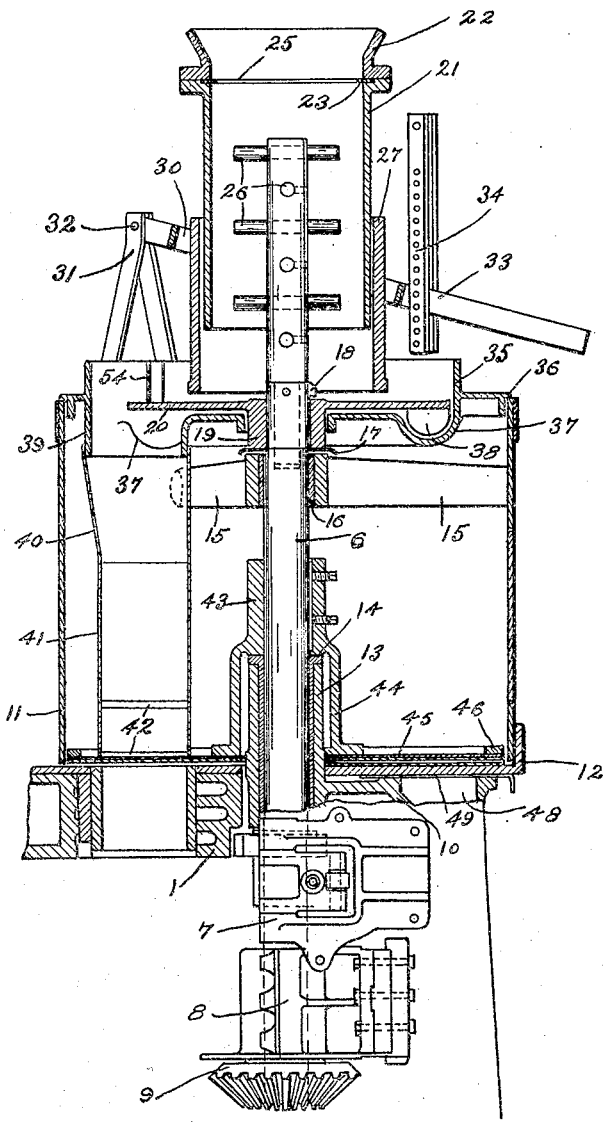

In said annexed drawings:

Fig. 1 is a fragmentary elevation of a material feeding device comprising my invention shown associated with the mold-carrying table of a brick press; and Fig. 2 is a transverse sectional view of the device shown in Fig. 1.

Referring more specifically to the drawings and more especially to Fig. 1, the device comprising my invention is here shown associated with a revolvable table 1 which is supported on a shaft 2 terminally mounted in the frame member 3 which forms a part of the main frame structure of the entire brick press. It will be noted in this connection that only so much of the main brick press is shown as is essential to the description of the device comprising my invention. The revolvable table 1 here shown for purposes of illustration has circumferentially disposed mold cavities 4 and 5 formed therein which, upon step-by-step rotation of the table 1, are respectively brought into feeding communication with the material-feeding device comprising my invention.

As most clearly shown in Fig. 2, positioned adjacent the revolvable table 1 is a vertically disposed drive shaft 6 which is at its lower portion revolvably supported by the bearing element 8 and has terminally mounted thereon a pinion 9 by means of which the shaft 6 is rotated from a source of power, not shown. Positioned on the frame structure 10, which is in association with the main frame of the brick press proper, is a substantially cylindrical frame structure 11 which is rigidly supported by the circularly disposed member 12. The frame member 10 has a varying support 13 formed integrally therewith, which is adapted to support the bushing 14 which, in turn, laterally supports the shaft 6. The cylindrical body 11 has plural spaced supporting arms 15 rigidly supported thereby which are centrally adapted to support the bushing 16 which laterally supports the upper portion of the revolvable shaft 6. The revolvable shaft 6 has an axially directed circumferential flange 17 secured thereto immediately above the bushing 16 to protect this bearing from the destructive elements such as dust, dirt, and the like, necessarily incident to the material feeding operation.

Rigidly secured to the revolvable shaft 6, by means of the key 18, is a hub 19 which has integrally formed therewith the radially-extending disc 20. Positioned above the disc 20 and co-axial with respect to the shaft 6 is a feed hopper 21 which has secured to its upper terminal portion a flared mouth-piece 22 adapted to receive the material to be fed. The juxtaposed faces of the members 21 and 22 are adapted to receive the slide member 23 which has its one end formed into a handle element 24 and its other end centrally provided with a substantially circular aperture 25. The revolvable shaft 6 has secured thereto a plurality of spaced diametrically opposed agitator elements 26 which, upon rotation of the shaft 6, prevent a caking or packing of the material in the hopper 21. Telescopically engaged by the lower portion of the hopper 21 is a sleeve 27 which is supported at 28 and 29 by circumferentially disposed bracket member 30 which is adapted to be pivotally supported at one end on the bracket 31 by means of the pin 32, and at its other end 33 is vertically adjustable in the supporting member 34. By a proper positioning of the member 33 with respect to the member 34, the distance between the lower terminal portion of the skirt 27 and the disc 20 may be effected to regulate the amount of material which is deposited on the disc 20. The disc 20 is in overlying relation to the circumferentially disposed member 35 which is at 36 supported on the cylindrical body 11 and which has a groove 37 formed therein adjacent the outer edge of the disc 20. The disc 20 has a depending ear 38 secured thereto, which ear projects into the groove 37 and upon rotation of the disc 20 clears such groove from any material which may have passed over the edge of the disc. The member 35 is at one side formed into a depending substantially rectangular discharge connection 39 which has secured thereto the enlarged portion 40 of the chute 41. The chute 41, which is substantially the same size as the mold apertures, and which is so positioned as to lie directly above the mold cavities in the revolvable table 1, has a plurality of bars 42 secured thereto which are adapted to separate the main stream of material passing through the chute 41 into as many streams as there are individual mold cavities in each group of molds in the table 1.

Rigidly secured to the shaft 6 intermediately of the bushings 14 and 16 is a hub 43 which has depending therefrom a skirt 44 which is adapted to rigidly support the disc 45. The disc 45 has an annular flange 46 secured thereto and an aperture 47 formed therein which, upon rotation of the revolvable shaft 6, opens and closes the discharge end of the chute 41 as the mold cavities are respectively moved into and out of communication with the feed chute. The frame structure 10 has an aperture 48 formed therein which is normally closed by the slide 49 by means of which the material which has found its way onto the upper surface of the disc 45 can be removed therefrom when the aperture 47 is positioned directly above the aperture 48. Secured to the bracket 50 is a scraper element 51 which is adjustably secured by the wing nut 52 and the pin 53. The scraper element 51 has a blade 54 secured thereto which is normally in overlying relation to the disc 20 and which causes the material on the disc 20 to be scraped into the chute 40.

In the operation of the device the shaft 6 and its associated parts is rotated in the direction indicated by the arrow in Fig. 1 and the material which passes down through the sleeve 27 forms a cone on the disc 20, the size of the cone being regulated by means of the member 33. The material forming the base of the cone is scraped off from the disc 20 into the chute 40 which feeds such material through the vertically disposed chute 41 over the separating bars 42 into the mold cavities 4 and 5. The position of the aperture 47 in the plate 45 is such that the disc 45 will open and close the delivery end of the chute 41 as the mold cavities are respectively moved in and out of communication with the lower end of the chute 41. The bars 42 which are positioned across the interior of the chute 41 divide the material as it passes downwardly therethrough so that separate streams of the material are set up, which streams are thus directed into the respective mold cavities. The provision of partition means in the chute also obviates the possibility of the disc 45 as it rotates, packing the material at one side of the chute which would result in the occurrence of different densities of the material in different areas in the mold or the formation of bricks of different densities when a plurality of grouped cavities are simultaneously fed from the chute.

By a combined adjustment of the sleeve 27 which regulates the volume of material deposited on the disc 20 and the scraper blade 54 or by a proper adjustment of either of these elements, the material which is fed from the disc 20 into the chute 40 can be so regulated as to maintain the height of the material in this chute at a constant level. By maintaining the material in the feed chute at a constant level a uniform density of the material as packed in the mold cavities is effected as hereinbefore explained.

It will be seen from the above description, the mold filling device comprising my invention makes possible a control over the material as fed which has not been possible with any of the forms of construction now in use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a mechanism of the character described, the combination with a mold conveying means; of a feed hopper; a chute from said hopper to said molds; and a revolvable disc for opening and closing the delivery end of said chute as said molds are placed respectively in and out of communication with said chute.

2. In a mechanism of the character described, the combination with a mold conveying means; of a feed hopper; a chute from said hopper to said molds; means for regulatably feeding material from said hopper to said chute, said means including a means adapted for telescopic engagement of said chute, means for axially adjusting said telescopic means, and a revolvable disc for opening and closing the delivery end of said chute as said molds are placed respectively in and out of communication with said chute.

3. In a mechanism of the character described, the combination of a mold conveying means, a feed hopper, a revolvable shaft extending into said hopper, agitator means carried by said shaft, a chute for delivering material from said hopper to said molds, a disc mounted on said shaft for feeding such material from said hopper to said chute, and a disc carried by said shaft adapted to open and close the delivery end of said chute as said molds are placed respectively in and out of communication with said chute.

4. In a mechanism of the character described, the combination of a mold conveying means, a feed hopper, a revolvable shaft extending into said hopper, agitator means carried by said shaft, a chute for delivering material from said hopper to said molds, a disc mounted on said shaft for feeding such material from said hopper to said chute, means telescopically engaged by said hopper for regulating the amount of material fed to said chute, and a disc carried by said shaft adapted to open and close the delivery end of said chute as said molds are placed respectively in and out of communication with said chute.

5. In a mechanism of the character described, the combination of a mold conveying means, a feed hopper, a revolvable shaft extending into said hopper, agitator means carried by said shaft, a chute for delivering material from said hopper to said molds, a disc mounted on said shaft for feeding such material from said hopper to said chute, means telescopically engaged by said hopper for regulating the amount of material passing from said hopper onto said feeding disc, means controlling the volume of material passing from said feeding disc to said chute, and a disc carried by said shaft adapted to open and close the delivery end of said chute as said molds are placed respectively in and out of communication with said chute.

6. In a mechanism of the character described, the combination with a mold conveying means, of a feed hopper, a chute in said hopper to said molds, partition means in said chute adjacent said molds, and a rotatable disc for opening and closing the delivery end of said chute as said molds are respectively in and out of communication with said chute.

7. In a mechanism of the character described, the combination with a table carrying a plurality of grouped molds, of a feed hopper, a chute from said hopper to said molds, partition means in said chute separating the stream of material therein into separate streams for each mold cavity, and a rotatable disc for opening and closing the delivery end of said chute as said molds are respectively in and out of communication with said chute.

Signed by me this 23 day of December, 1929.

ROBERT B. STUCKEY.